(12) United States Patent
Sih et al.

(10) Patent No.: US 6,480,529 B1
(45) Date of Patent: Nov. 12, 2002

(54) PROGRAMMABLE MATCHED FILTER SEARCHER FOR MULTIPLE PILOT SEARCHING

(75) Inventors: Gilbert C. Sih, San Diego, CA (US);
Ian Fevrier, San Diego, CA (US);
Inyup Kang, San Diego, CA (US);
Christopher Patrick, Del Mar, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/468,556

(22) Filed: Dec. 21, 1999

(51) Int. Cl.[7] .......................... H04B 15/00; H04K 1/00; H04L 27/30

(52) U.S. Cl. ...................... 375/152; 375/143; 375/147; 375/343

(58) Field of Search ................................ 375/152, 143, 375/343, 147, 136

(56) References Cited

U.S. PATENT DOCUMENTS 5,577,025 A  * 11/1996  Skinner et al. ............... 370/22
5,715,276 A  *  2/1998  Tran et al. ................... 375/207

* cited by examiner

Primary Examiner—Mohammad H. Ghayour
(74) Attorney, Agent, or Firm—Philip R. Wadsworth; Charles D. Brown; Howard H. Sao

(57) ABSTRACT

A novel and improved method and apparatus for searching is described. This searcher combines the ability to search multiple offsets of single pilots, such as those found in the IS-95 system, with the ability to search multiple pilots, such as those found in a GPS location determination system. Both types of searching can be done in a single architecture combining the parallel computation features of a matched filter with the flexibility of allowing a variable number of coherent accumulations and a variable number of non-coherent accumulations to be performed at high speed for a wide range of search hypotheses in a resource efficient manner. This invention allows for parallel use of the matched filter structure in a time-sliced manner to search multiple windows. In addition, the searcher allows for optional independent Walsh decovering for each search window. The time-sharing approach allows for optional frequency searching of any offset.

14 Claims, 7 Drawing Sheets

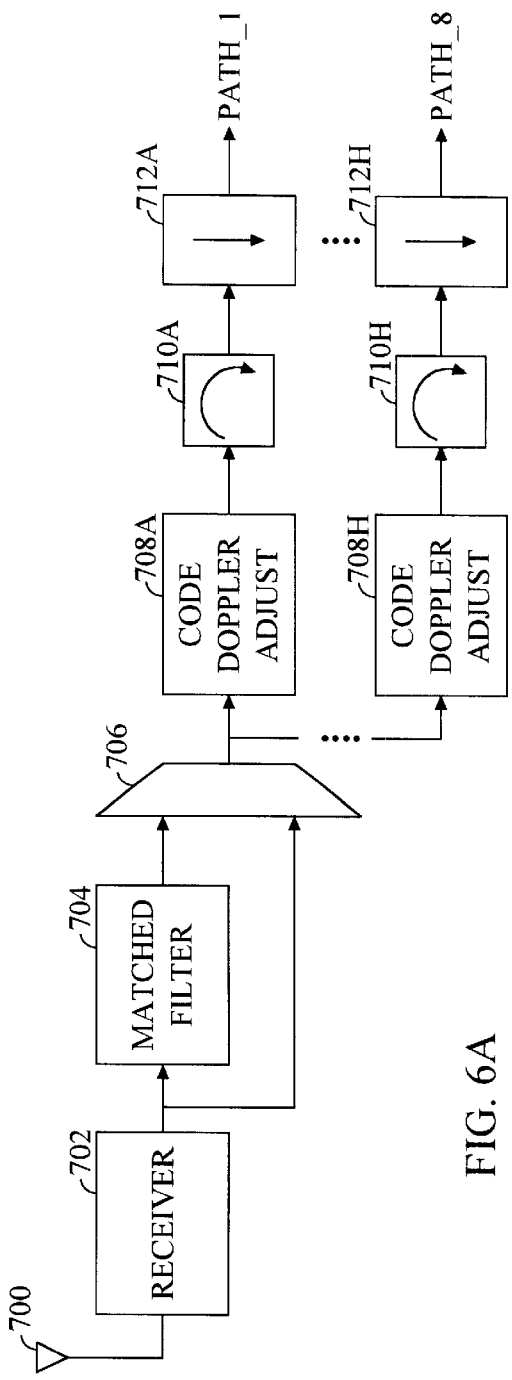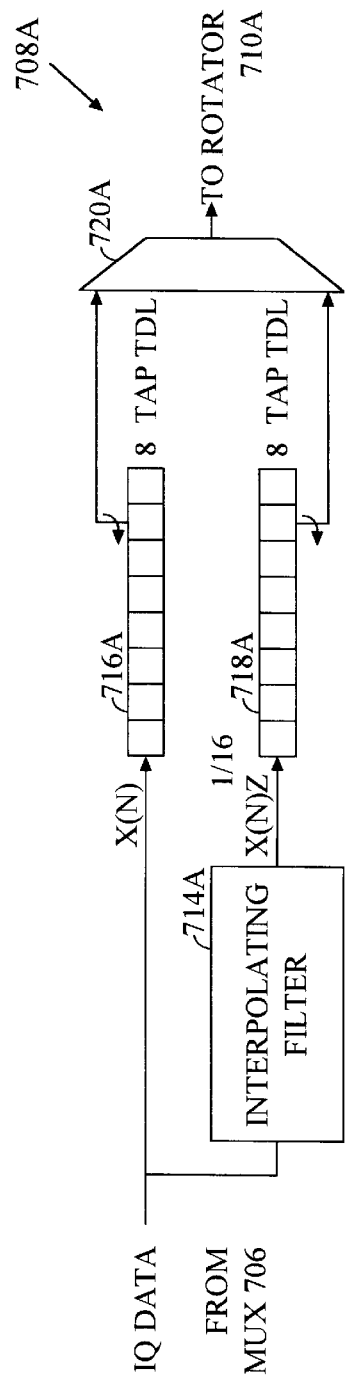
FIG. 6A
FIG. 6B

PROGRAMMABLE MATCHED FILTER SEARCHER FOR MULTIPLE PILOT SEARCHING

BACKGROUND OF THE INVENTION

I. Field of the Invention

The present invention relates to communications. More particularly, the present invention relates to a novel and improved method and apparatus for detecting one or more pilot signals with a programmable matched filter searcher.

II. Description of the Related Art

Pseudorandom noise (PN) sequences are commonly used in direct sequence spread spectrum communication systems such as that described in the IS-95 over the air interface standard and its derivatives such as IS-95-A and ANSI J-STD-008 (referred to hereafter collectively as the IS-95 standard) promulgated by the Telecommunication Industry Association (TIA) and used primarily within cellular telecommunications systems. The IS-95 standard incorporates code division multiple access (CDMA) signal modulation techniques to conduct multiple communications simultaneously over the same RF bandwidth. When combined with comprehensive power control, conducting multiple communications over the same bandwidth increases the total number of calls and other communications that can be conducted in a wireless communication system by, among other things, increasing the frequency reuse in comparison to other wireless telecommunication technologies. The use of CDMA techniques in a multiple access communication system is disclosed in U.S. Pat. No. 4,901,307, entitled "SPREAD SPECTRUM COMMUNICATION SYSTEM USING SATELLITE OR TERRESTRIAL REPEATERS", and U.S. Pat. No. 5,103,459, entitled "SYSTEM AND METHOD FOR GENERATING SIGNAL WAVEFORMS IN A CDMA CELLULAR TELEPHONE SYSTEM", both of which are assigned to the assignee of the present invention and incorporated by reference herein.

FIG. 1 provides a highly simplified illustration of a cellular telephone system configured in accordance with the use of the IS-95 standard. During operation, a set of subscriber units 10a–d conduct wireless communication by establishing one or more RF interfaces with one or more base stations 12a–d using CDMA modulated RF signals. Each RF interface between a base station 12 and a subscriber unit 10 is comprised of a forward link signal transmitted from the base station 12, and a reverse link signal transmitted from the subscriber unit. Using these RF interfaces, a communication with another user is generally conducted by way of mobile telephone switching office (MTSO) 14 and public switch telephone network (PSTN) 16. The links between base stations 12, MTSO 14 and PSTN 16 are usually formed via wire line connections, although the use of additional RF or microwave links is also known.

Each subscriber unit 10 communicates with one or more base stations 12 by utilizing a rake receiver. A RAKE receiver is described in U.S. Pat. No. 5,109,390 entitled "DIVERSITY RECEIVER IN A CDMA CELLULAR TELEPHONE SYSTEM", assigned to the assignee of the present invention and incorporated herein by reference. A rake receiver is typically made up of one or more searchers for locating direct and multipath pilot from neighboring base stations, and two or more fingers for receiving and combining information signals from those base stations. Searchers are described in co-pending U.S. patent application Ser. No. 08/316,177, entitled "MULTIPATH SEARCH PROCESSOR FOR SPREAD SPECTRUM MULTIPLE ACCESS COMMUNICATION SYSTEMS", filed Sep. 30, 1994, assigned to the assignee of the present invention and incorporated herein by reference.

Inherent in the design of direct sequence spread spectrum communication systems is the requirement that a receiver must align its PN sequences to those of the base station. In IS-95, each base station and subscriber unit uses the exact same PN sequences. A base station distinguishes itself from other base stations by inserting a unique offset in the generation of its PN sequences. In IS-95 systems, all base stations are offset by an integer multiple of 64 chips. A subscriber unit communicates with a base station by assigning at least one finger to that base station. An assigned finger must insert the appropriate offset into its PN sequence in order to communicate with that base station. It is also possible to differentiate base stations by using unique PN sequences for each rather than offsets of the same PN sequence. In this case, fingers would adjust their PN generators to produce the appropriate PN sequence for the base station to which it is assigned.

Subscriber units locate base stations by utilizing searchers. A fast, flexible, and hardware efficient matched filter searcher is described in co-pending U.S. patent application Ser. No. 09/283,010 (hereinafter the '010 application), entitled "PROGRAMMABLE MATCHED FILTER SEARCHER", filed Mar. 31,1999, assigned to the assignee of the present invention and incorporated herein by reference. This searcher adds flexibility to the parallel computation features of a matched filter, allowing a variable number of coherent accumulations and a variable number of non-coherent accumulations to be performed at high speed for a wide range of search hypotheses in a resource efficient manner. Many of the features of this searcher are applicable to the present invention as well, and will be described in greater detail below.

The FCC has mandated that by October 2001, carriers must provide the location of a cell phone user making an emergency 911 call to within 125 meters. In addition to providing mandated location services, wireless carriers are interested in providing revenue-generating location-based services such as roadside assistance, traffic updates, yellow page directory assistance, and the like.

A variety of approaches can be taken to solve this problem, among them are solutions based on the Global Positioning System (GPS). The Global Positioning System comprises a constellation of 24 satellites. Each satellite contains a clock that is kept synchronized to GPS time by monitoring ground stations. GPS receivers on the ground can use signals received from several GPS satellites to determine position and time.

Each GPS satellite transmits two microwave carriers: a 1575.42 MHz L1 carrier which carries the signals used for Standard Positioning Service (SPS), and a 1227.60 MHz L2 carrier which carries signals needed for Precise Positioning Service (PPS). PPS is used by governmental agencies and allows a higher degree of accuracy in positioning.

The L1 carrier is modulated by the Coarse Acquisition (C/A) code, a 1023-chip pseudorandom code transmitted at 1.023 Mcps that is used for civil position location services. Each GPS satellite has its own C/A code that repeats every 1 ms. The code used for PPS is a 10.23 MHz code that is 267 days in length.

Each GPS satellite has a different C/A code that belongs to a family of codes called Gold codes. Gold codes are used because the cross-correlation between them is small. Each GPS satellite generates a unique C/A code sequence. A GPS receiver reproduces the C/A sequence for a particular satellite and correlates it with the received signal over all possible offsets. When correlation is found, the start time of the code is referred to as the time of arrival (TOA) at the receiver. This TOA is a measure of the range to the satellite, with an offset due to any mismatch between the receiver clock and GPS time. The TOA is also referred to as the pseudorange. Once the pseudoranges from each of 4 satellites have been obtained, a position fix can be computed by solving for the intersection of 4 spheres. Using 4 satellites allows the receiver clock uncertainty to be cancelled out.

GPS position location can be done based solely on signals received from GPS satellites, as just described, but can also be accomplished using a hybrid scheme. Such hybrid schemes are often useful when additional information is available to reduce the complexity of the position location task. One example is a wireless network, where the base station can provide information to limit the required search windows or can provide accurate time corresponding to GPS time. One such system is described in co-pending U.S. patent application Ser. No. 09/187,939, entitled "MOBILE COMMUNICATION SYSTEM WITH POSITION DETECTION TO FACILITATE HARD HANDOFF", filed Nov. 6, 1998, assigned to the assignee of the present invention and incorporated herein by reference.

There is commonality in the hardware needed to search for CDMA pilots (or the like) and that needed for position location (whether pure GPS or some hybrid). However, in contrast to the single pilot code systems such as that described in IS-95, multiple pilot code systems such as GPS would inherently benefit from the ability to search more than one pilot code simultaneously. Many devices, such as subscriber unit 10 in FIG. 1, will need to perform both types of searching during their normal course of operation. There is a need in the art for a fast, flexible, hardware-efficient searcher that combines CDMA pilot searching with multiple pilot searching for systems such as GPS position location.

SUMMARY OF THE INVENTION

A novel and improved method and apparatus for searching is described. This searcher combines the ability to search multiple offsets of single pilots, such as those found in the IS-95 system, with the ability to search multiple pilots, such as those found in a GPS location determination system. Both types of searching can be done in a single architecture combining the parallel computation features of a matched filter with the flexibility of allowing a variable number of coherent accumulations and a variable number of non-coherent accumulations to be performed at high speed for a wide range of search hypotheses in a resource efficient manner. This invention allows for parallel use of the matched filter structure in a time-sliced as well as space-sliced manner to search multiple windows. In addition, the searcher allows for optional independent Walsh decovering for each search window. Both approaches allow for optional frequency searching of any offset.

I and Q channel data are despread utilizing a matched filter structure. The matched filter structure can be configured as one large matched filter with a single I/Q data input, or it can be configured to accept a plurality of signals, essentially breaking the matched filter into a plurality of smaller matched filters (this essentially describes space-slicing). The plurality of inputs can be independent signals from a variety of sources, such as multiple satellites in a GPS network.

The in-phase and quadrature amplitudes from the matched filter are delivered to coherent accumulators to sum for a programmable duration of time. This coherent accumulation can occur for the entire matched filter structure, or multiple accumulations can be generated based on the subsets of the matched filter associated with each of a plurality of input signals. These coherent accumulations are available for further processing in a device such as a DSP. For single pilot searching, the coherent amplitude accumulations are squared and summed to produce an energy measurement. The energy measurement is accumulated for a second programmable time to perform non-coherent accumulation. The resulting value is used to determine the likelihood of a pilot signal at that offset.

Each matched filter structure comprises an N-value shift register for receiving data, a programmable bank of taps to perform despreading and optional Walsh decovering, and an adder structure to sum the resulting filter tap calculations. The matched filter structure can optionally be used in a time-sharing manner to search multiple windows as dictated by a multiplexor which supplies various streams of tap values for despreading (with optional Walsh decovering included in the tap values). In addition, an optional phase rotator can be added to apply multiplexed phase values to perform frequency searching. Every cycle the matched filter structure produces an intermediate calculation for a particular offset (with optional Walsh decovering and optional phase rotation) which includes N calculations based on the data in the shift register.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 6A–6D contain a more detailed block diagram configured in accordance with the present invention;

DETAILED DESCRIPTION OF THE PREFERRED EMBODIMENTS

Figure 1:
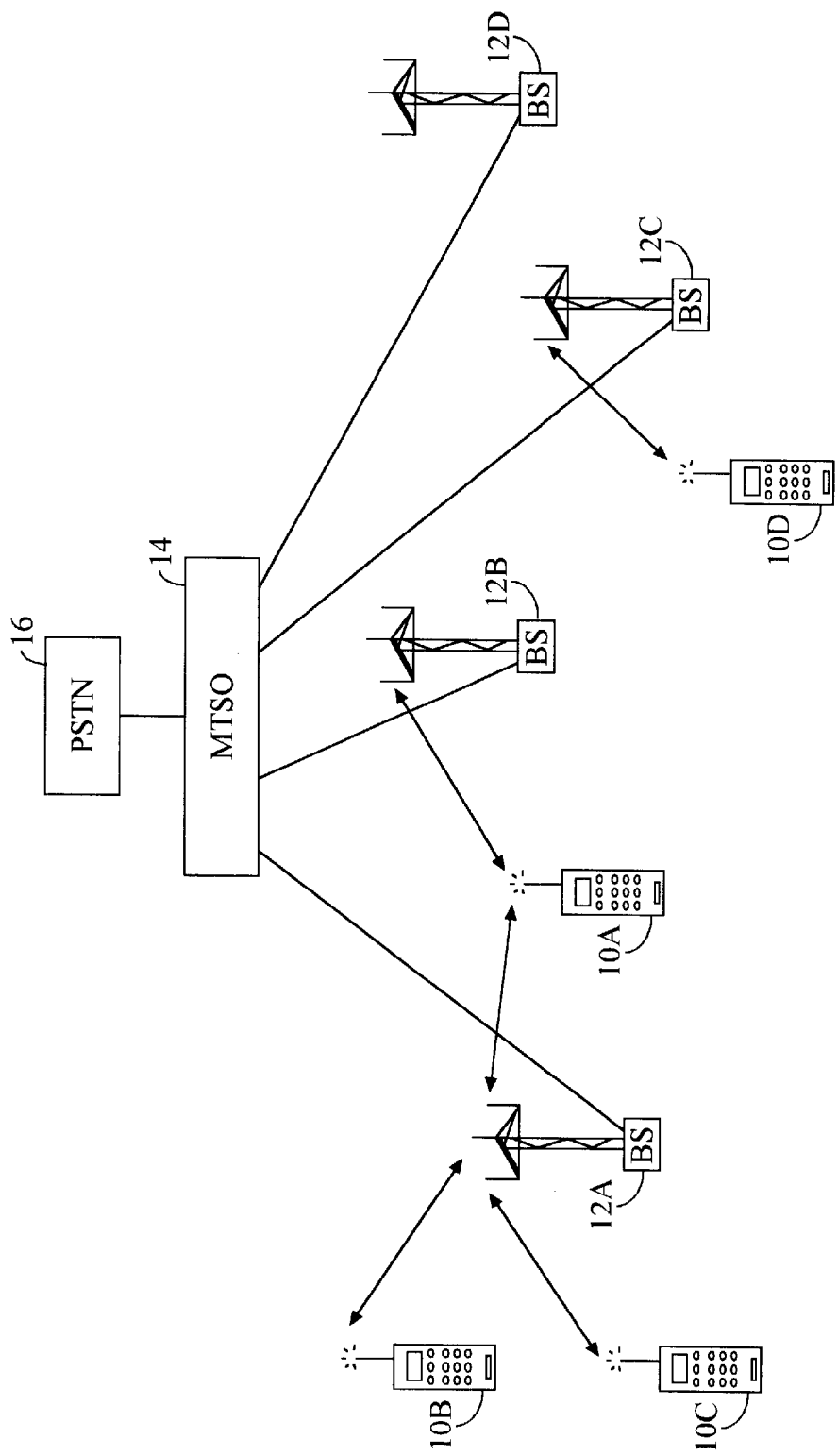
FIG. 1 is a block diagram of cellular telephone system.
Figure 2:
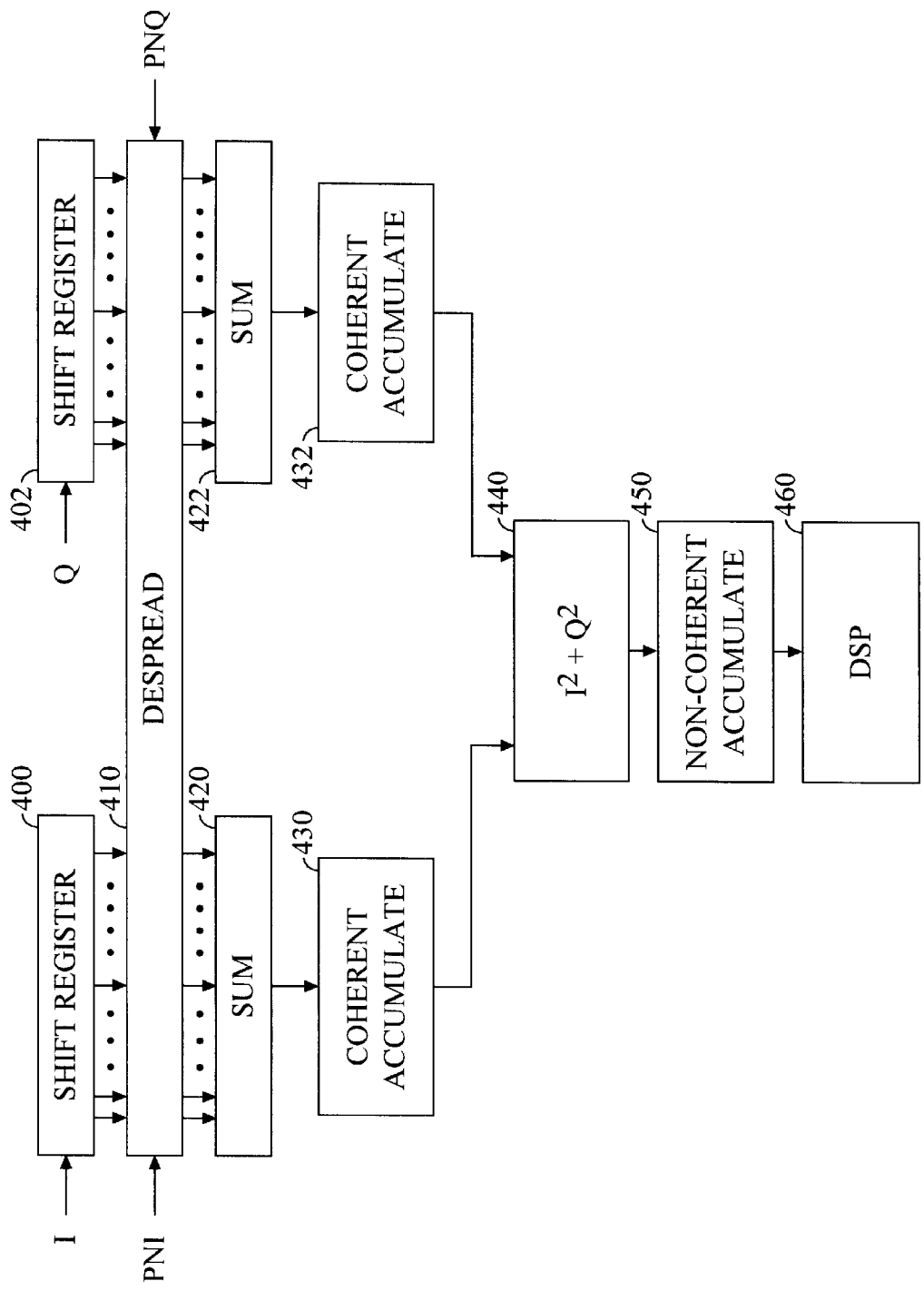
FIG. 2 is a block diagram of a prior art programmable matched filter searcher.

FIG. 2 depicts a simplified diagram of a searcher configured in accordance with the invention disclosed in the '010 application. The features of the '010 invention are reiterated here, followed by the modifications to be made in accordance with the present invention. One of the novel features of the present invention is to allow the increased functionality of GPS searching while utilizing an architecture that is very similar to that described in the '010 application.

I and Q data (Hereinafter $D_I$ and $D_Q$) enters shift registers 400 and 402, respectively. The size of the matched filter component of this invention is given by N. The number of memory locations in the shift registers is, in the exemplary embodiment, given by 2N−1. Data is continually loaded and shifted through the shift registers at a constant rate. In the exemplary embodiment, data is loaded in at twice the chip rate. This allows for searching on every chip and half-chip boundary. Essentially, two different chip rate sequences can be despread every chip duration.

Figure 3:
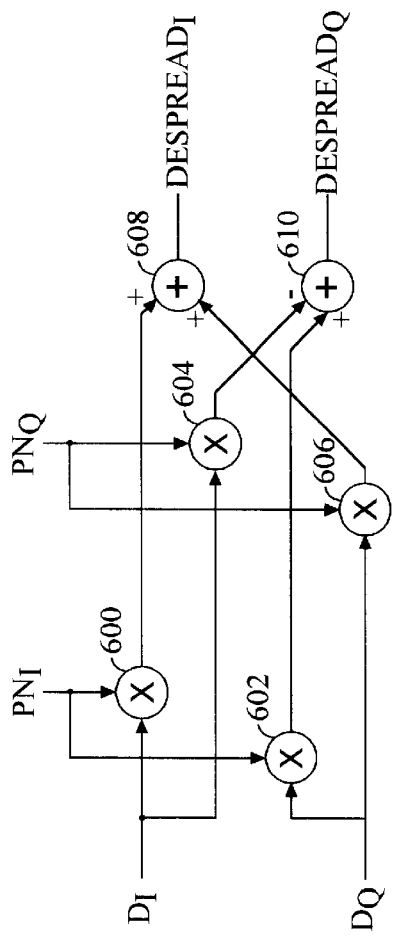
FIG. 3 depicts a QPSK despreader.

The data in shift registers 400 and 402 are then correlated with N-bit portions of the I and Q PN sequences (Hereinafter $PN_I$ and $PN_Q$) which are loaded into despreader 410. To despread a QPSK spread pilot signal, complex despreading is performed: $(D_I+jD_Q)\cdot(PN_I-jPN_Q)=(D_I PN_I+D_Q PN_Q)+j(D_Q PN_I-D_I PN_Q)$. FIG. 3 depicts one stage of the N-stage QPSK despreader. One of the N values of $D_I$ is multiplied by the corresponding tap value $PN_I$ in multiplier 600 and by the corresponding tap value $PN_Q$ in multiplier 604. Similarly, $D_Q$ is multiplied by tap values $PN_I$ and $PN_Q$ in multipliers 604 and 606, respectively. The output of multipliers 600 and 606 are summed in adder 608. The output of multiplier 604 is subtracted from the output of multiplier 602 in adder 610. The output of adder 608 is the despread I value. The output of adder 610 is the despread Q value. Since there are N stages, there will be N such complex results.

Figure 4:
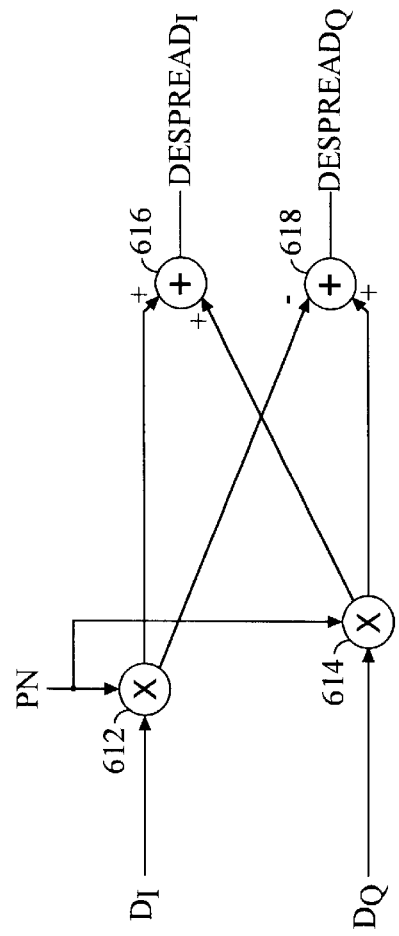
FIG. 4 depicts a BPSK despreader.

The present invention is also useful for BPSK despreading. In this case there is only a single PN sequence to correlate with, which provides the tap values for both the I and Q in despreader 410. The circuit shown in FIG. 3 can be used as is with the single PN sequence being delivered to both $PN_I$ and $PN_Q$. FIG. 4 shows the simplified despreader which can be used if only BPSK despreading is desired. $D_I$ and $D_Q$ are multiplied by the PN sequence in multipliers 612 and 614 respectively. The results are summed in adder 616 to produce the despread I value. The output of multiplier 612 is subtracted from multiplier 614 in adder 618 to produce the despread Q value. Again there are N stages, so there will be N complex results.

Although FIG. 3 and FIG. 4 show multipliers in use, simplifications are known in the art When the tap values are binary, as they are in the exemplary embodiment, consisting only of the values 1 and −1, and the proper data format is chosen for $D_I$ and $D_Q$, the despreading step can be accomplished utilizing only XOR gates and multiplexors (details not shown).

The N despread I and despread Q values produced in despreader 410 are summed respectively in summers 420 and 422. Each time the data in shift registers 400 and 402 change, new sums are calculated in summers 420 and 422, as shown in FIG. 2. Each sum is an N-chip coherent accumulation of a particular offset. The process is repeated for a programmable number of cycles without changing the tap values in despreader 410. For example, in the exemplary embodiment the matched filter size, N, is 64. Suppose a search window size, L, of 64 and a coherent accumulation, C, of 256 was desired. In this case, the tap values appropriate for the beginning of the window are loaded into despreader 410 and data is cycled through the shift register, producing results from summers 420 and 422 each cycle.

Each result is loaded into coherent accumulators 430 and 432, respectively. These accumulators accommodate multiple accumulations at a single time. In the exemplary embodiment, they are RAM based. During each cycle, the appropriate partial accumulation is retrieved, added to the output of either summer 420 or 422, and the resultant partial accumulation is stored again in the RAM. In our example, when 64 cycles have passed, the first 64 I and Q sums have been loaded into accumulators 430 and 432. Each of these sums corresponds to a C of 64, since that is the width of the matched filter.

During this time, a new set of tap values for despreader 410 has been calculated. These are calculated so that the same 64 offset hypotheses that were tested in the first pass can be tested again. If the tap values were not changed, a new offset would be tested with each cycle until the entire PN space had been searched (like a standard matched filter searcher). The matched filter procedure is repeated again for another 64 cycles. This time, each result is summed with the corresponding partial accumulation for its offset as stored in accumulators 430 and 432. After 64 cycles have passed, each partial accumulation is made up of two 64 chip partial accumulations, corresponding to a C of 128. The process is repeated twice more, changing the taps each time until the accumulators have accumulated four 64 chip values for the desired C of 256. In this configuration, the searcher can perform coherent accumulation on any C that is an integer multiple of N. The window size that can be concurrently searched is determined by the number of partial accumulations which can be stored in accumulators 430 and 432. (The upper bound on C is determined by the number of bits of precision employed and scaling techniques used, if any. Those skilled in the art can readily design circuits which accommodate a desired C value.)

The loading of PN tap values is performed as follows: the PN sequences will be generated differently depending on whether the same set of hypotheses is to be tested or a new set is beginning. In the exemplary embodiment, the PN sequences are generated via linear feedback shift register (LFSR) based PN generators. The timing of tap generation is best explained with an example. In the exemplary embodiment, the matched filter is N values wide so an N bit tap sequence must be generated. For simplicity we will assume that data changes at the chip rate which is the same rate the PN generators must be updated. This is in contrast to the exemplary embodiment in which data is updated at twice the chip rate, so two data samples are correlated with each PN state. Suppose that we wish to accumulate C=192 values for a window size of 128. Assume our PN generator has generated the appropriate first 64 I and Q tap values which are loaded into despreader 410. 64 sets of data will cycle through shift registers 400 and 402. For each set a 64 value coherent I sum is calculated and stored in coherent accumulator 430 and a 64 value coherent Q sum is calculated and stored in accumulator 432. Each coherent sum corresponds to one of the first 64 sequential offset hypotheses being searched. Since a C of 192 is desired, the above 64 cycles must be repeated 3 times to reach 192. But appropriate steps must be taken to properly align the PN taps in despreader 410 to the incoming data. We desire that the same offsets be tested again to produce the second set of coherent values. The PN generators used to create the pilot signal being searched for have moved forward 64 chips. Therefore the receiving searcher also needs to load a new set of PN values 64 chips forward to retest the same offsets. These values are created by the PN generators while the first 64 sums are generated. The process is repeated for the third set to create coherent accumulations of 192 chips.

Now the first half of the search window has been performed. The PN generators used to create the pilot signal being searched for have moved forward by 64 chips again. If we loaded a similar advanced PN sequence into despreader 410, we would collect more data on the first 64 offsets, which is not needed in this example. Instead, we wish to introduce an offset of 64 to test the next 64 offsets. We can do this by simply not updating the PN values (since the PN sequence in the incoming data has advanced in relation to the values presently in despreader 410). When the first 64 calculations are performed for the second half of the window, a new set of PN values must be loaded in despreader 410 to collect more data on the same offsets, just as described above. The process repeats until 192 chips worth of data have been accumulated.

When the coherent accumulations of the I and Q data are complete as just described, the resultant values are squared and summed (I^2+Q^2) as shown in energy calculator 440. The result for each offset is loaded into non-coherent accumulator 450. This accumulator is a multi-accumulation capable accumulator similar to accumulators 430 and 432. For the programmed number of non-coherent accumulations, M, the values of independent coherent accumulations are accumulated for each offset in the search window. Each time the energy is stored in non-coherent accumulator 450, the partial accumulations in coherent accumulators 430 and 432 are reset for another C calculations.

Those skilled in the art will employ myriad solutions to process the results stored in non-coherent accumulator 450. In the exemplary embodiment, the results of non-coherent accumulator 450 are delivered to DSP 460 where the values are examined to determine which offset in the search window, if any, likely corresponds to the location of a pilot signal. DSP 460, which can be any DSP or microprocessor capable of performing the desired operations, can control all of the matched filter searching procedures. It may be dedicated to the searcher, or the search functions may make up just a fraction of the various tasks that DSP 400 performs in the operation of the subscriber unit. The entire process as just described can be repeated for multiple search windows if necessary.

Figure 5:
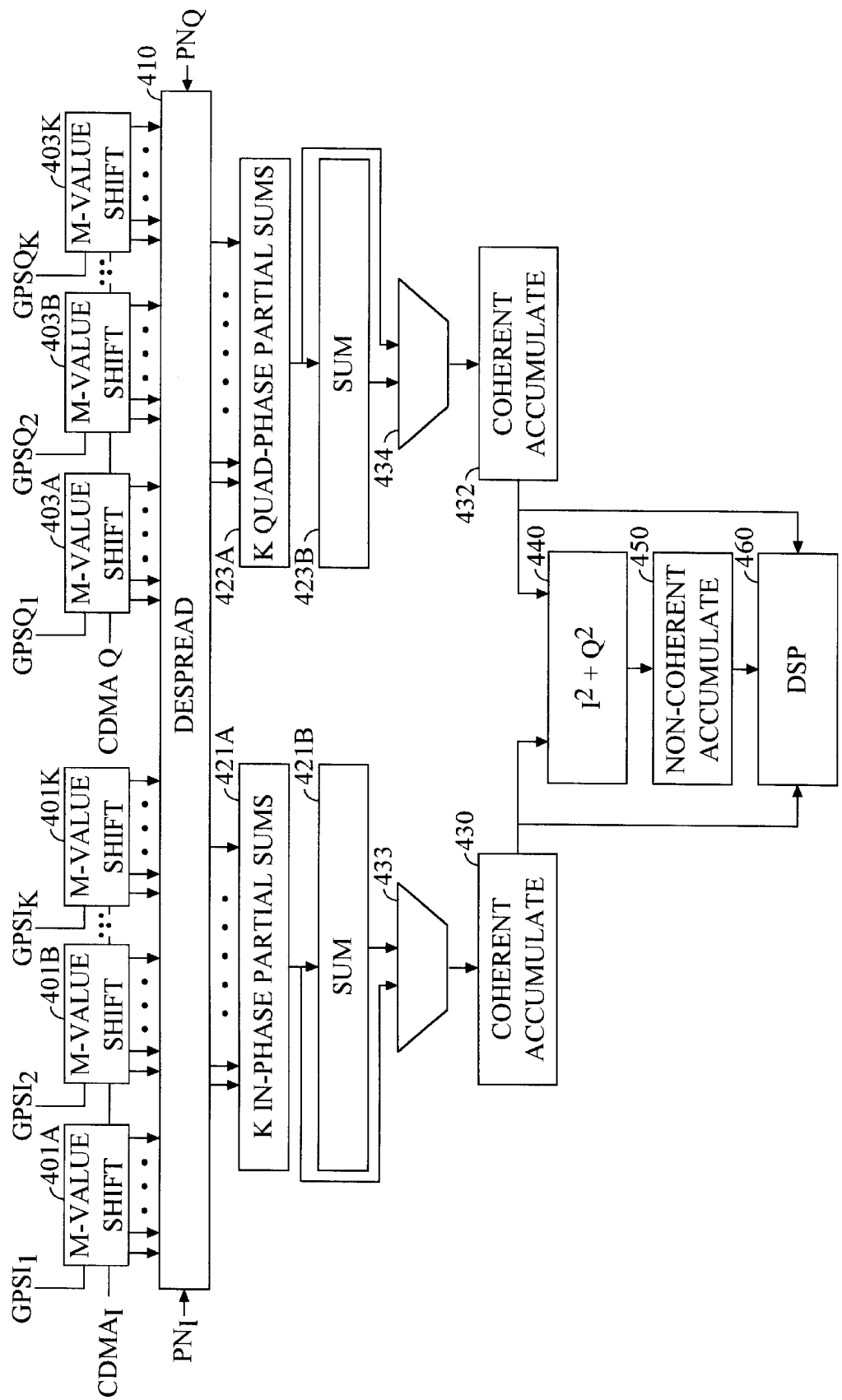
FIG. 5 is a block diagram of a matched filter searcher configured in accordance with the present invention.

FIG. 5 depicts the searcher of FIG. 2 modified in accordance with the present invention. Like numbered objects are identical in the two figures, and the modifications will be detailed below.

N-value shift registers 400 and 402, from FIG. 2, have been replaced with series of M-value shift registers 401A–K and 403A–K respectively. Each M-value shift register 401A–K and 403A–K has a selectable input which can be set to select a GPS input (from among $GPSI_{1-K}$ and $GPSQ_{1-K}$ respectively) or the output of the prior M-value shift register (except for the initial registers, 401A and 403A, which select the CDMA I and Q sequences, respectively).

When configured for CDMA pilot searching, as described above, each M-value register is configured to select as its input the output of the prior M-value register (except for the initial registers, 401A and 403A, which select the CDMA I and Q sequences, respectively). In this mode, M-value shift registers 401A–K and 403A–K function identically to the N-value shift registers, 400 and 402 respectively, that they replace.

When configured for GPS searching, each M-value shift register 401A–K or 403A–K selects as its input the in-phase or quadrature component of the GPS signal it is to decode, namely $GPSI_{1-K}$ and $GPSQ_{1-K}$ respectively. Those skilled in the art will recognize that a variety of configurations of the M-value registers are possible. For example, when K registers are available but only K/2 pilots need to be searched, the K registers can be configured in pairs to form K/2 2M-valued registers. Implementors of this invention can choose the level of independent programmability of the selectable inputs of M-value shift registers 401A–K and 403A–K to suit their specific requirements.

The outputs of M-value shift register 401A–K and 403A–K are then despread in despreader 410 in the fashion described above in reference to FIG. 3 and FIG. 4. The PN sequences for the despreading are chosen based upon whether CDMA pilot searching or GPS pilot searching is required. The appropriate codes are loaded into despreader 410. In FIG. 5, only a single in-phase code (PNI) and a single quadrature phase code (PNQ) are shown as inputs to despreader 410. This configuration requires the K GPS codes to be concatenated and loaded serially. Those skilled in the art will know how to provide additional taps to allow multiple sections of the despreader to be loaded with GPS or CDMA codes, and this option is detailed below in reference to FIG. 6D. (Keep in mind that CDMA and GPS pilot searching are the options selected in the exemplary embodiment of this invention. Those skilled in the art will recognize that this invention is readily usable for other situations in which a variable number of sources must be searched with a variable number of different PN sequences.)

Summers 420 and 422 of FIG. 2 are replaced in FIG. 5 with partial summers 421A and 423A followed by additional summers 421B and 423B. Summer 421A computes K sums of the despread in-phase results and summer 423A computes K sums of despread quadrature phase results. These results are the complete sums when the searcher is operating in GPS mode, and the results are delivered to mux 433 and mux 434, respectively. When the searcher is configured for CDMA pilot searching, the K sums represent partial sums, and they must be summed in summers 421B and 423B, respectively. The results of summers 421B and 423B are delivered to muxes 433 and 434.

Muxes 433 and 434 are used to select between the partial sums (which represent complete sums for the K individual GPS pilots) and the complete sum used for CDMA pilot searching. The results are delivered to coherent accumulators 430 and 432 respectively. In CDMA mode, coherent accumulators 430 and 432 function as described above in reference to FIG. 2. Without modification, only the memory element of the accumulators is useful during GPS mode—the results must be delivered to a processor such as DSP 460, as shown, for coherent accumulation. Another option is to construct coherent accumulators 430 and 432 in a programmable fashion such that the integrated adders (not shown) can be reconfigured to produce K accumulations when GPS searching is being conducted. In either case, in the exemplary embodiment, the results are delivered to DSP 460 for energy computation, non-coherent accumulation, peak detection, and other processing necessary for pseudorange generation. This is not mandatory, as hardware used for CDMA pilot detection can be deployed to compute values for GPS detection as well. However, rather than a single path, as is the case for CDMA, K paths would need to be constructed to give the K desired results. This would require K times the hardware or a factor K increase in processing speed (if the existing hardware were time-shared).

The results from coherent accumulators 430 and 432 are delivered to energy calculator 440, non-coherent accumulator 450, and then to DSP 460 for processing in the fashion described in reference to FIG. 2 above.

FIGS. 6A–6D depict the exemplary embodiment of the present invention. This embodiment is configured to support CDMA searching or simultaneous search of eight GPS satellites with minimal impact or increase in hardware required of the CDMA searcher described in the '010 application.

In FIG. 6A, received signals enter antenna 700 and RF processing tasks such as amplification, down-conversion, filtering, and A/D conversion are carried out in receiver 702. The results are delivered to optional matched filter 704 and mux 706. Mux 706 selects the filtered or non-filtered version to be processed by the eight GPS front ends, comprised of blocks 708A–H, 710A–H, and 712A–H. Code doppler adjust blocks 708A–H receive the signal from mux 706. The resultant code doppler adjusted signals are processed in rotators 710A–H, respectively, to accommodate the independent frequency doppler effects from the eight satellites. These resultant signals are decimated in decimators 712A–H. Decimation is optional. In the exemplary embodiment, the digital IQ samples coming from receiver 702 are sampled at chipx8, or eight times the chip rate. The exemplary decimators 712A–H provide output signals which can be at rates chipx8 (no decimation), chipx4, or chipx2. The outputs of decimators 712A–H are labeled PATH__1 through PATH__8, respecively.

Figure 6C:
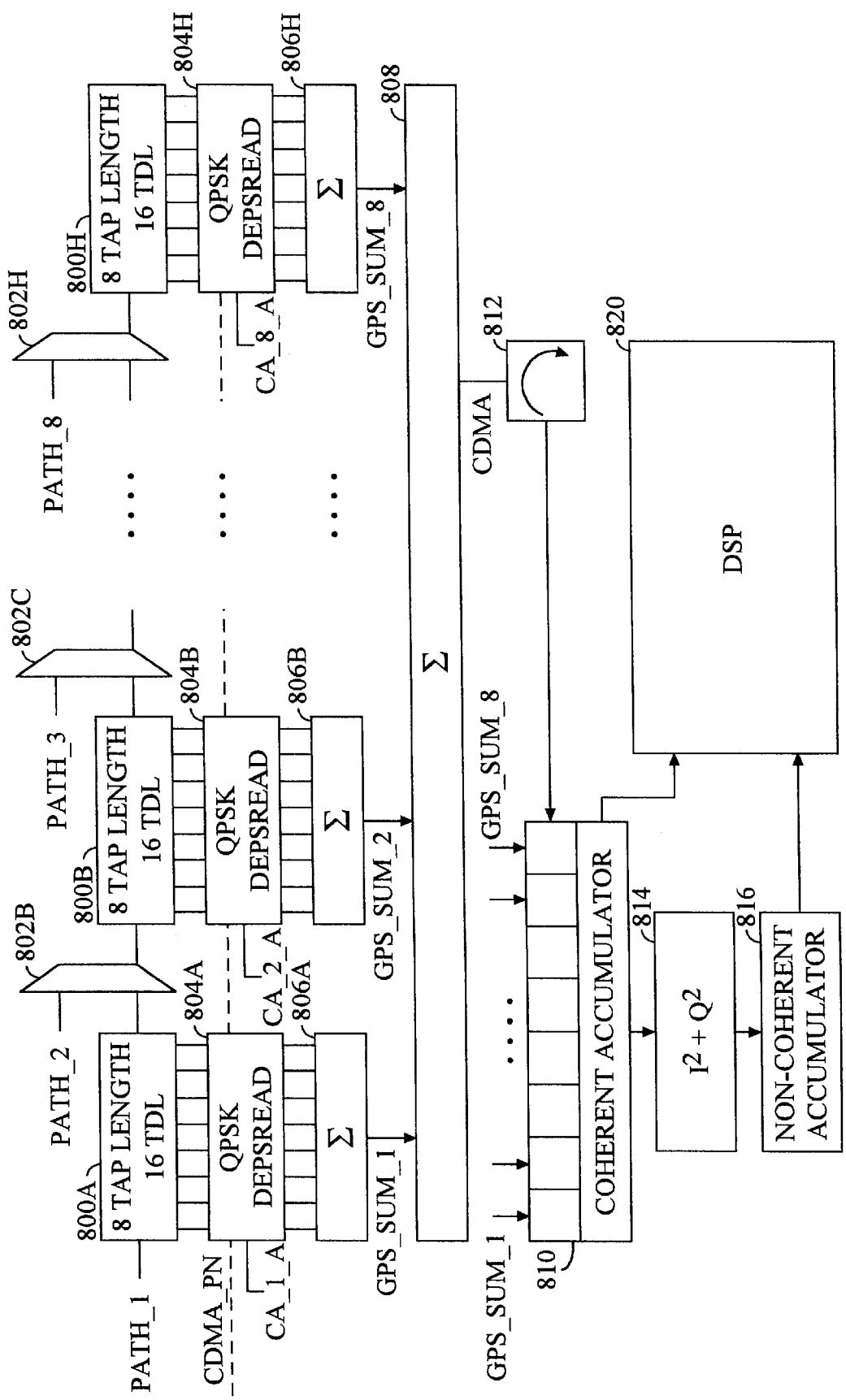

FIG. 6B shows the exemplary code doppler adjust block. It is labeled as code doppler adjust block 708A, but is representative of blocks 708A–H. IQ data from mux 706 enters and is delivered to tap delay line 716A, which has eight taps in the exemplary embodiment. The IQ data also goes to optional interpolating filter 714A. The output of interpolating filter 714A is delivered to tap delay line 718A, also containing 8 taps in the exemplary embodiment. Each output of tap delay lines 716A and 718A is selectably controlled by a DSP (DSP 820 in FIG. 6C). Mux 720A selects one output of either tap delay line 716A or 716B, and delivers the output to rotator 710A, as described above.

In FIG. 6C, signals PATH__2 through PATH__8 are shown entering muxes 802B–H, respectively. These muxes are used to switch the input to tap delay lines (TDL) 800B–H between signals PATH__2 through PATH__8 and the output of the prior TDL, 800A–G, respectively. PATH__1 feeds directly into TDL 800A. Those skilled in the art will recognize the option to program the entire path from antenna 700 through to PATH__1 such that it represents the CDMA pilot search data or data for one of the eight GPS search pilots. Each of TDL 800A–H is of length 16 with 8 taps. This allows for computation on half-chip boundaries. The results of each of TDL 800A–H are directed to QPSK despreaders 804A–H, where despreading occurs with either the PN sequence for CDMA pilot searching, labeled CDMA__PN, or one of the GPS coarse acquisition sequences CA__1__A through CA__8__A.

Figure 6D:
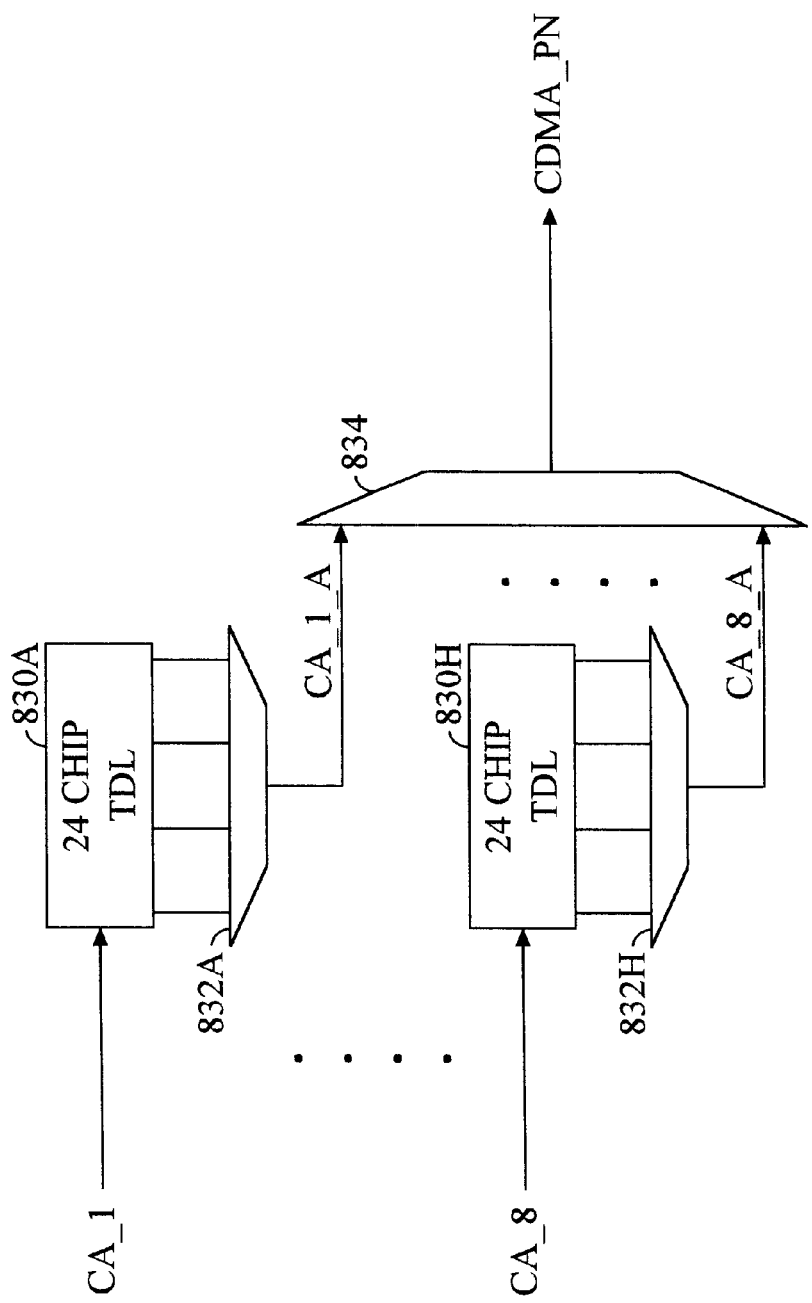

As an alternative, as shown in relation to despreader 410 in FIG. 5, the codes CA__1__A through CA__8__A can be sequenced onto the single chained input to despreaders 804A–H as shown through input CDMA__PN. In the exemplary embodiment, as shown in FIG. 6C, each of sequences CA__1__A through CA__8__A feeds directly into despreaders 804A–H, respectively. The generation of these sequences is shown in FIG. 6D. Separate gold code generators for each channel (not shown) produce sequences CA__1 through CA$_3$__8, which feed into TDLs 830A–H. Each of these TDLs is of length 24 with taps at positions 0,4,8,16, and 24. The outputs of these taps are selected at rate chipx8 by muxes 832A–H to produce signals CA__1__A through CA__8__A. This allows each GPS channel to search up to four adjacent windows spanning 16 chipx2 hypotheses in every eight-chip interval during a coarse search. Mux 834 is used to concatenate these sequences for delivery to QPSK despreader 804A through input CDMA__PN.

The despread results are delivered to summers 806A–H to produce the values labeled GPS__sum__1 through GPS__sum__8. These values are available for accumulation in coherent accumulator 810. In CDMA mode, these values represent partial sums and must be summed in summer 808. The resultant signal is labeled CDMA. The CDMA signal can be rotated in rotator 812 (this block is optional) and the result is also available to coherent accumulator 810. Coherent accumulator selects between the GPS sums or the CDMA value depending on the current operational mode.

The results of the coherent accumulation are delivered to DSP 820 during GPS searching. During CDMA searching, the results of coherent accumulation are delivered to energy calculator 814. Those results are passed on to non-coherent accumulator 816, and those outputs are delivered to DSP 820. (Note that other hardware processing may take place after non-coherent accumulation rather than in the DSP, as discussed in the '010 application.)

Thus, a method and apparatus for a programmable matched filter searcher for multiple pilot searching has been described. The description is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A programmable matched filter searcher comprising:

a shift register, operating as a single shift register when receiving a first type of data and operating as a multiple shift registers when receiving a second type of data, the first type of data being received from a single source and the second type of data being received from a plurality of sources;

a PN generator for generating PN sequences;

a despreader for receiving the PN sequences and the data from the shift register and for producing sets of despread values, the despreader concurrently receiving multiple PN sequences while despreading the second type of data;

a first set of summers for summing the sets of despread values from the despreader, for producing a complete sum when the data from the shift register are the second type of data, and for producing a partial sum when the data from the shift register are the first type of data; and a second set of summers for receiving the partial sum from the first set of summers and producing a complete sum when the data from the shift register are the first type of data.

2. The programmable matched filter searcher of claim 1 wherein said sets of incoming data from said plurality of sources are received from a plurality of path processors, each of said path processors comprising:

a code doppler adjust block;

a frequency rotator; and an optional decimator.

3. A programmable matched filter searcher comprising:

a first shift register, operating as a single shift register when receiving a first type of data and operating as a multiple shift registers when receiving a second type of data, for receiving sets of incoming in-phase(I) first or second type of data from one or a plurality of sources;

a second shift register, operating as a single shift register when receiving a first type of data and operating as a multiple shift registers when receiving a second type of data, for receiving sets of incoming quadrature (Q) first or second type of data from one or a plurality of sources;

a PN generator for generating PN sequences;

a matched filter having:

a despreader for receiving said sets of I data, said sets of Q data, and said PN sequences and for producing sets of despread I values and producing sets of despread Q values, the despreader concurrently receiving multiple PN sequences and producing distinct sets of despread I and Q values when receiving second type of data from the first and second shift registers;

a first set of summers for summing the sets of despread I and Q values from the despreader, for producing complete I and Q sums when the data from the first and second shift registers are the second type of data, and for producing partial I and Q sums when the data from the first and second shift registers are the first type of data;

a second set of summers for receiving the partial sums from the first set of summers and producing complete I and Q sums when the data from the shift registers are the first type of data an I accumulator for receiving said complete I sums and accumulating them in sets to produce a set of accumulated I sums;

a Q accumulator for receiving said complete Q sums and accumulating them in sets to produce a set of accumulated Q sums;

an energy calculator for receiving sets of accumulated I sums and sets of accumulated Q sums, squaring respective ones of sets of accumulated I sums, squaring respective ones of sets of accumulated Q sums, and summing the results of said squares of respective ones of sets of I and Q sums to produce sets of energy values; and outputs for providing said set of accumulated I sums and said set of accumulated Q sums prior to processing in said energy calculator.

4. The programmable matched filter searcher of claim 3 further comprising an accumulator for receiving said sets of energy values and producing sets of accumulations of ones of said sets of energy values.

5. The programmable matched filter searcher of claim 4 wherein:

I and Q PN sequences are produced by said PN generator; and said despreader performs QPSK despreading.

6. The programmable matched filter searcher of claim 4 wherein said despreader performs BPSK despreading.

7. The programmable matched filter searcher of claim 4 further comprising a multiplexor for receiving multiple PN sequences and delivering them for time-sharing of said matched filter to produce additional sets of sums based on said multiple PN sequences.

8. The programmable matched filter searcher of claim 4 further comprising:

a multiplexor for receiving one or more phase values; and

I and Q rotators for receiving outputs said I and Q loadable matched filters and rotating said outputs according to the phase output of said multiplexor, and delivering the results to said I and Q accumulators.

9. A programmable matched filter searcher comprising:

a shift register, operating as a single shift register when receiving a first type of data and operating as a multiple shift registers when receiving a second type of data, the first type of data being received from a single source and the second type of data being received from a plurality of sources;

a plurality of PN generators for generating a plurality of PN sequences;

a loadable matched filter for loading said plurality of PN sequences, despreading said sets of incoming data and summing the intermediate results; and an accumulator for receiving said sums and accumulating them in sets to produce a set of accumulated sums.

10. The programmable matched filter searcher of claim 9 wherein said loadable matched filter is configurable to receive a single PN sequence from one of said plurality of PN generators or a plurality of PN sequences from said plurality of PN generators.

11. A method for performing programmable matched filter searching comprising the steps of:

a) storing one set of I and Q data in a shift register if the data is a first type of data and storing a plurality of sets of I and Q data in the shift register if the data is a second type of data;

b) producing one or a plurality of PN sequences;

c) despreading the data with one PN sequence if the data are of the first type to produce a set of I and Q despread values and despreading the data with plurality of PN sequences if the data are of the second type to produce sets of I and Q despread values;

d) summing results of said despread I values;

e) summing results of said despread Q values;

f) accumulating the resultant summed despread I values to produce one or a plurality of results, respectively; and g) accumulating the resultant summed despread Q values to produce one or a plurality of results, respectively.

12. The method of claim 11 further comprising the steps of:

i) squaring the accumulated despread I values;

j) squaring the accumulated despread Q values; and k) summing both said squares.

13. The method of claim 12 further comprising the step l) of accumulating said sum of squares.

14. The method of claim 13 further comprising the step h) of providing as outputs said plurality of accumulated summed despread I and Q values calculated in said steps f) and g) when said plurality of sets of I and Q data are stored in said step a) and alternately proceeding to perform said steps i) through l) when said one set of I and Q data is stored in step a).

* * * * *